Figure 1:
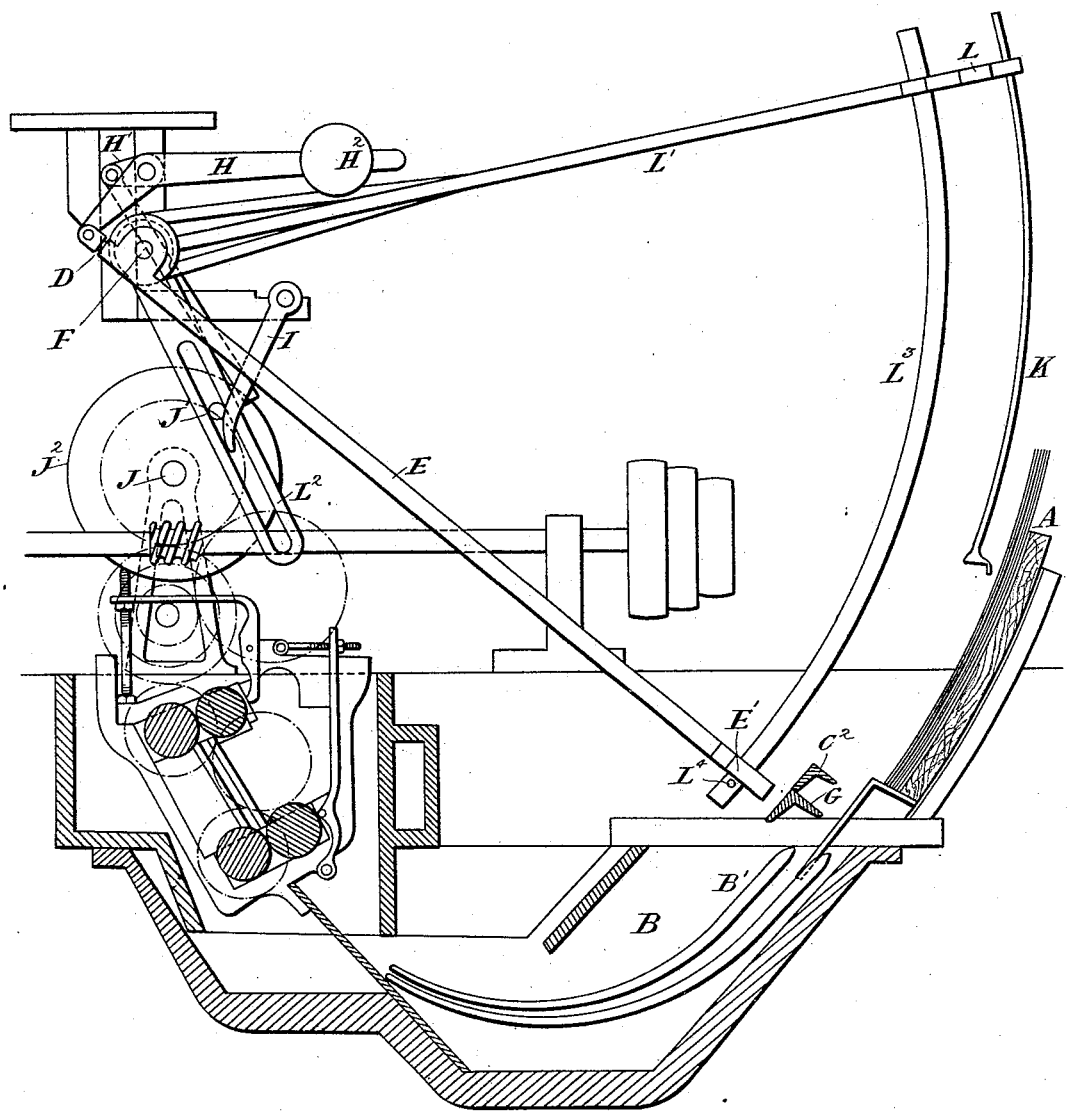

(No Model.) 6 Sheets—Sheet 5.
D. EDWARDS.
APPARATUS FOR MANUFACTURING TIN PLATE.

No. 486,635. Patented Nov. 22, 1892.

Witnesses
B. W. Miller.
C. H. Sensner.

Inventor
Daniel Edwards,
By his Attorneys
Baldwin, Davidson & Wight.

(No Model.) 6 Sheets—Sheet 6.
D. EDWARDS.
APPARATUS FOR MANUFACTURING TIN PLATE.
No. 486,635. Patented Nov. 22, 1892.
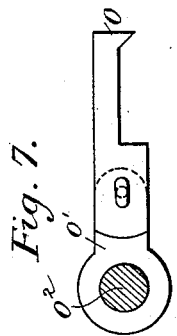
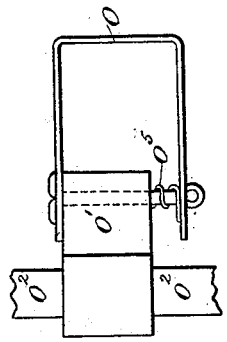
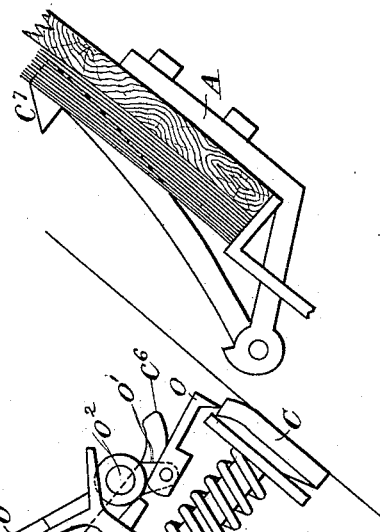
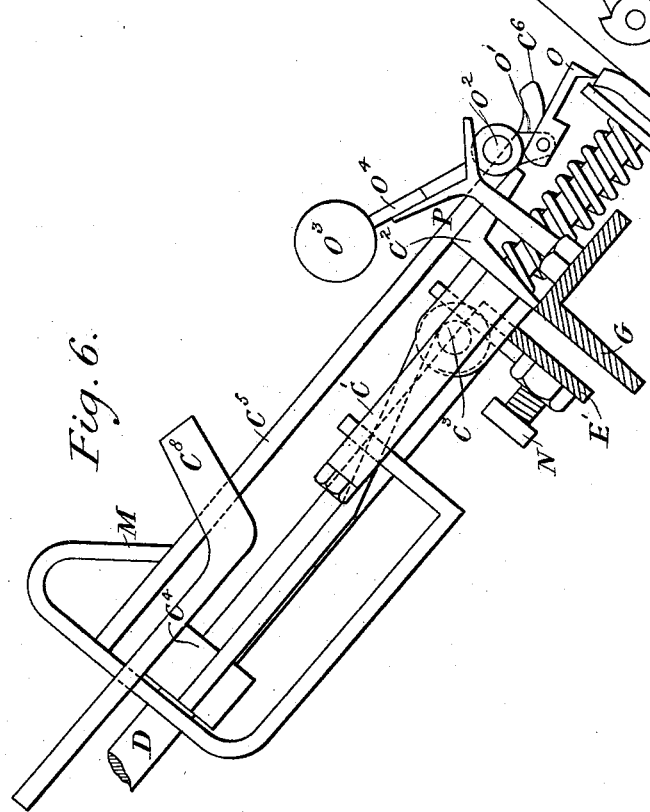
Witnesses
B. W. Miller
C. F. Senoner
Inventor
Daniel Edwards,
By his Attorneys,
Baldwin Davidson & Wight.

UNITED STATES PATENT OFFICE.

DANIEL EDWARDS, OF MORRISTON, ENGLAND.

APPARATUS FOR MANUFACTURING TIN-PLATE.

SPECIFICATION forming part of Letters Patent No. 486,635, dated November 22, 1892.

Application filed April 12, 1892. Serial No. 428,871. (No model.)

*To all whom it may concern:*

Be it known that I, DANIEL EDWARDS, tin-plate manufacturer, a subject of the Queen of Great Britain, residing at Dyffryn Steel and Tin Plate Works, Morriston, in the county of Glamorgan, Wales, have invented certain new and useful Improvements in Apparatus Used in the Manufacture of Tin, Terne, and other Coated-Metal Plates, of which the following is a specification.

The object of this invention is to enable the plates which are to be coated to be delivered automatically one by one to guide rolls or carriers which pass down into the tinning-pot and to push the plates along the guide rolls or carriers up to the rolls which are at the exit end of the pot. The invention is more especially applicable to apparatus such as is described in the specification of Patent No. 432,520; but can also be adapted to other forms of coating apparatus. To feed plates one by one into the tinning-pot, I place a pile of plates at the front of the pot, sloping somewhat downward. To take the plates one by one from the pile, I use a pneumatic sucker carried at the end of an arm which extends radially from a horizontal axis which is parallel with the front end of the pot. When the arm is approximately at right angles to the plate, the sucker is thrust outward along the arm and brought against the front plate. The sucker being pressed against the plate is collapsed and air expelled from it, and is thereby caused to obtain a hold of the plate, so that when the sucker is drawn back it tends to draw the plate away from the others. To insure that a single plate only shall be detached from the pile by the sucker, I preferably apply the sucker against the lower portion of the plate, and when the sucker has got hold of the plate I give to it a slight tilting movement, so as to tend to bend the lower edge of the plate away from the others and admit air between it and the next plate. As soon as the plate is detached its lower edge is brought by the sucker into position to drop between the upper ends of the guides which lead down into the pot. The sucker is then caused to release its hold of the plate by admitting air between it and the plate. A pusher is next brought against the rear edge of the plate and pushes the plate forward along the guides until the forward end of the plate is seized by the rolls. Afterward the pusher is carried back to its former position, ready to act in the same way upon the next plate.

The drawings annexed show apparatus acting in the manner above described.

Figure 2:
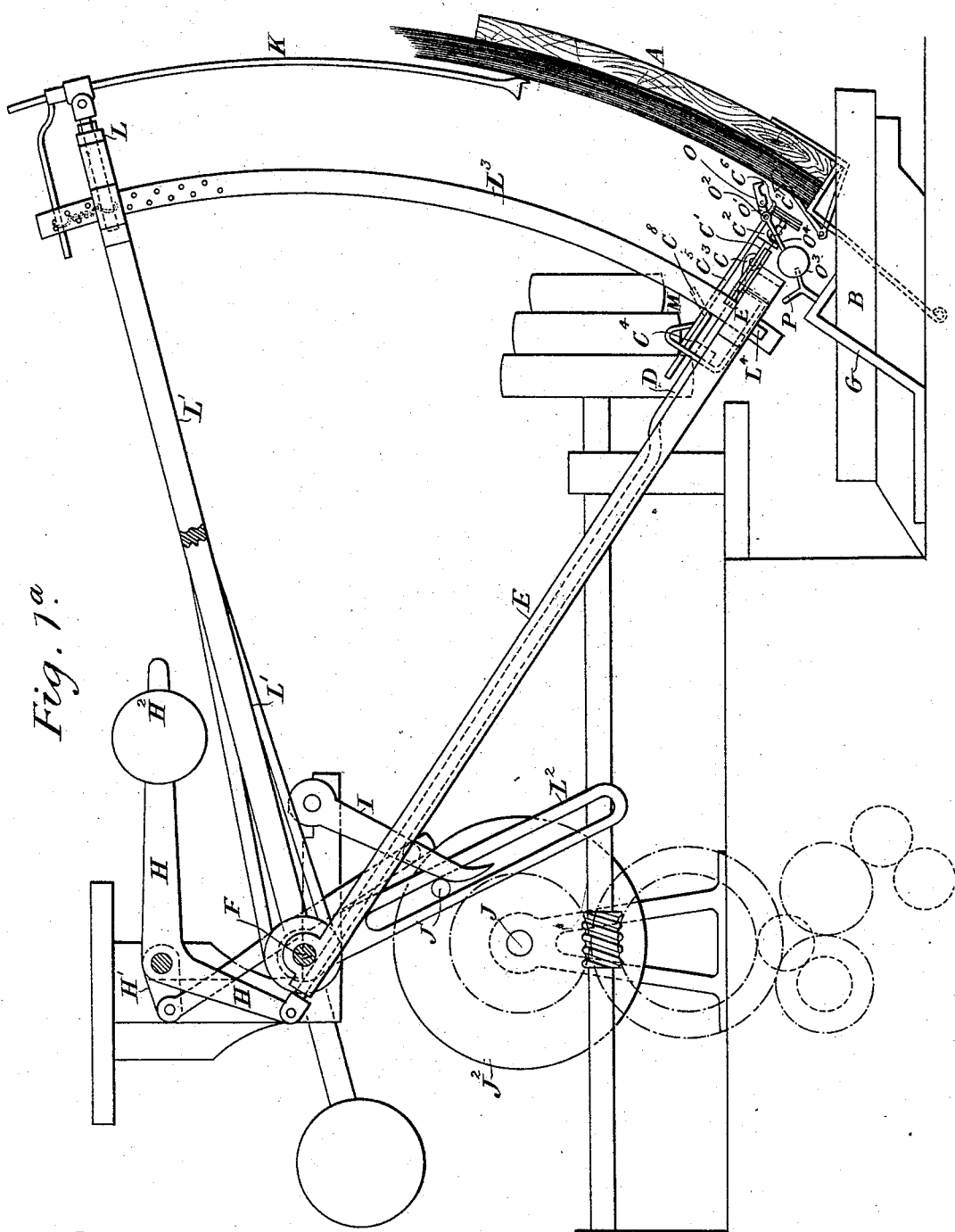
Figure 3:
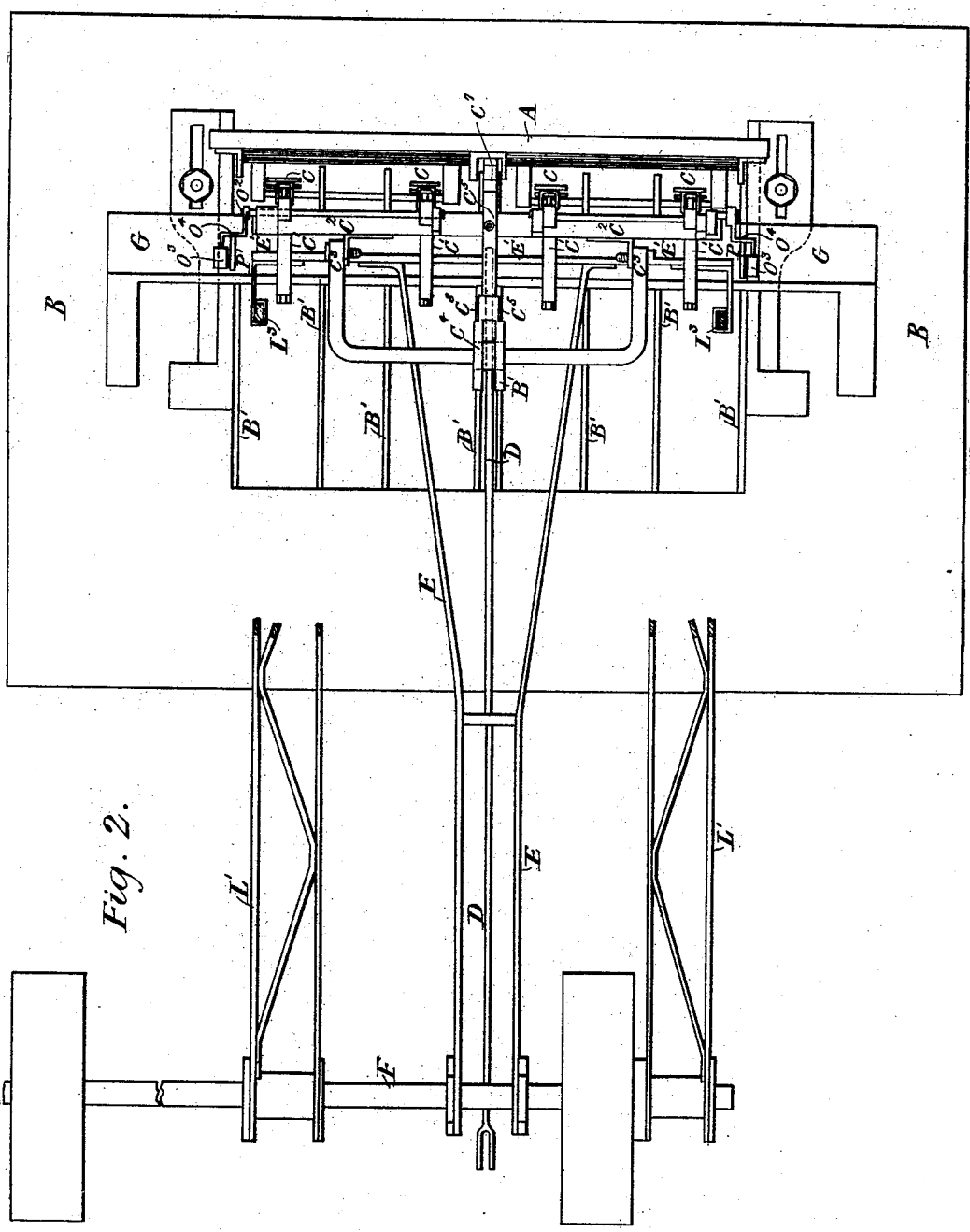
Figure 4:
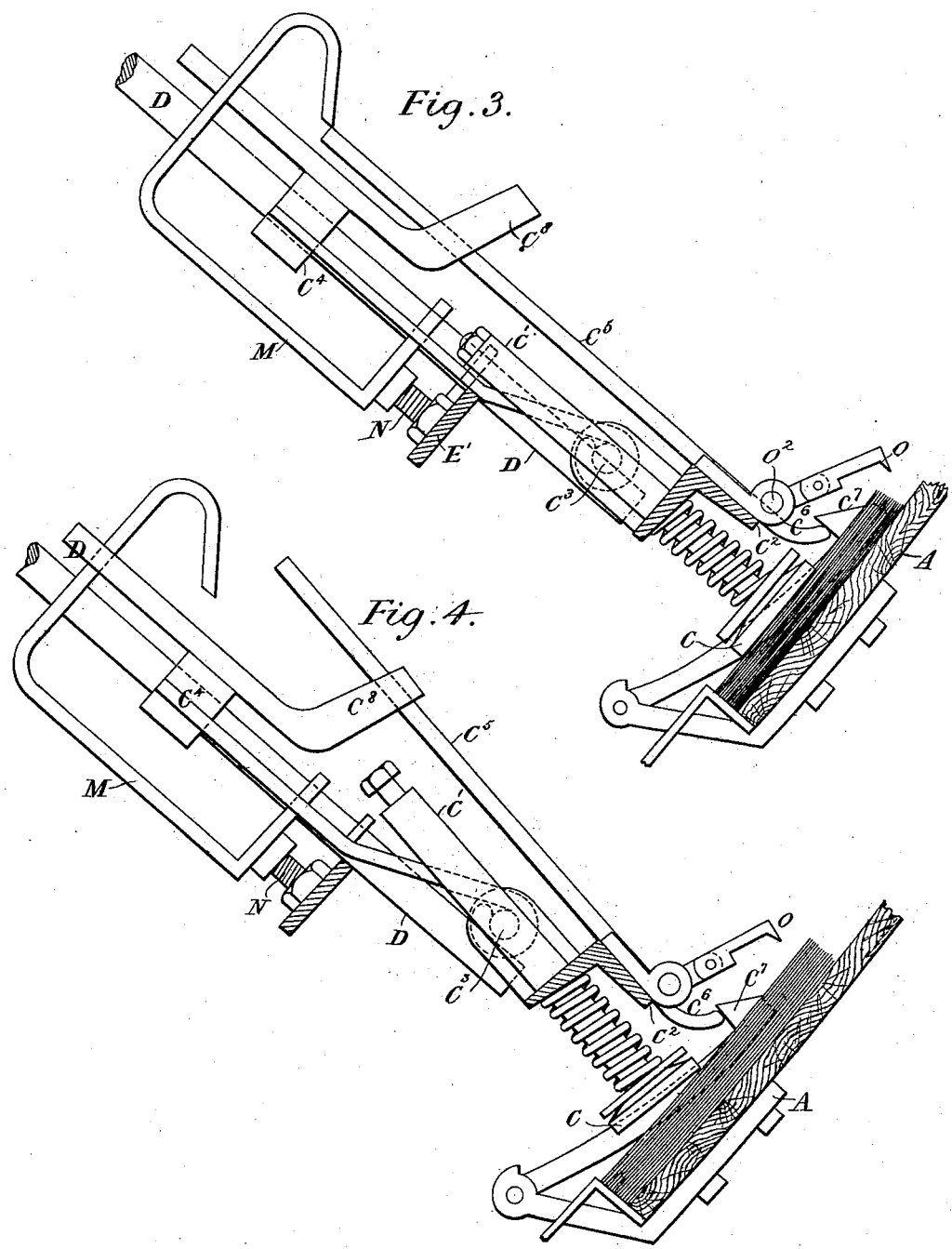
Figure 5:
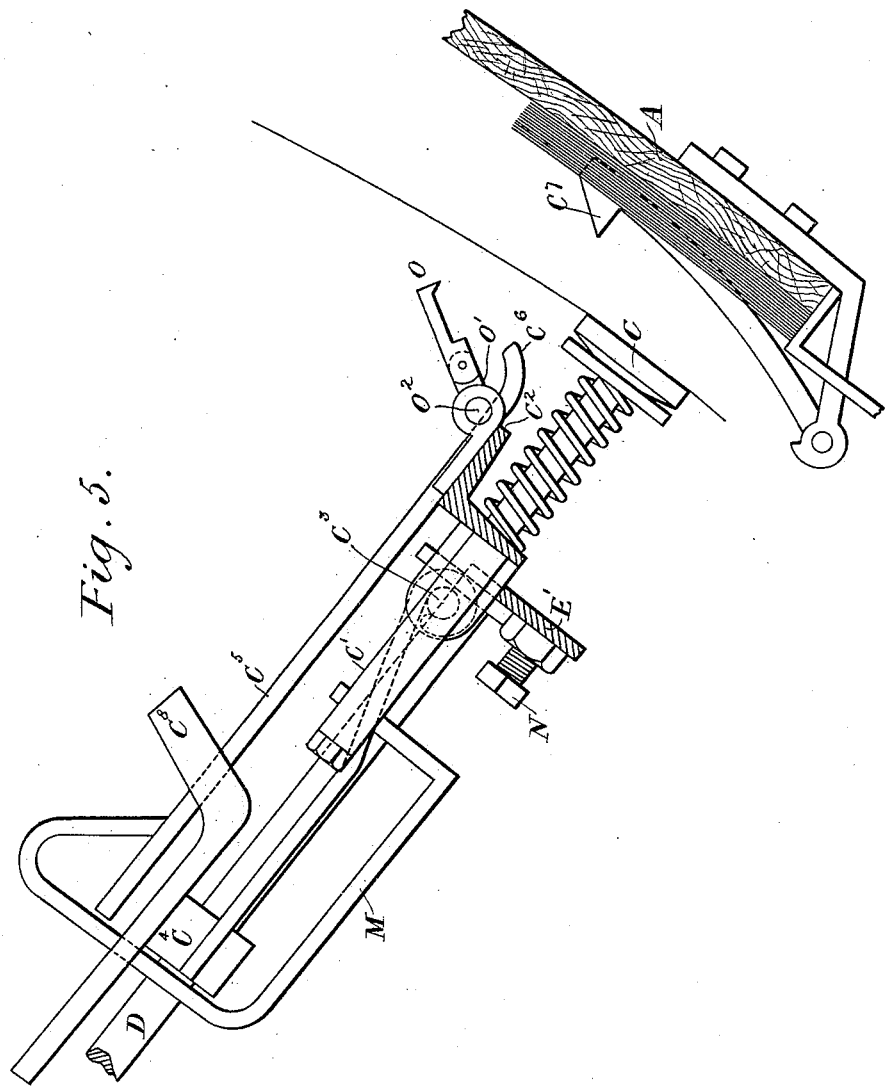

Figure 1 is a vertical longitudinal section of the apparatus. Fig. 1$^a$ is part of the same on a larger scale, and Fig. 2 is a plan view with some parts removed, the view being taken in the direction of the arrow in Fig. 1. Fig. 3 is a diagram view of one of the suckers and parts in connection with it. This diagram shows the position of the parts at the time when the sucker is being pressed against the pile of plates. Fig. 4 is a similar diagram showing the position of the parts when the sucker is being tilted. Fig. 5 shows the position of the parts when the sucker has been drawn back. Fig. 6 shows the position of the parts when the plate has been carried into position to be dropped into the tinning-pot. Figs. 7 and 8 show separate views of the claw used for releasing the suckers.

A is an inclined table or support, upon which is to be placed the pile of plates which are to be passed one by one into the tinning-pot.

B is part of the upper portion of the tinning-pot, above which the inclined table A is supported. In the drawing Fig. 2 the pot is shown as being of a width for two plates to be treated simultaneously.

C C are suckers, two for each plate. Each is composed simply of a disk of vulcanized india-rubber secured at the center to the center of a metal disk, which is at the end of a rod that can play to and fro freely in tubular guides C'. These guides are all secured to a bar C$^2$, which, as shown, is jointed by joints C$^3$ to arms which extend from a boss C$^4$, that is fast on the end of a rod D. The rod D is supported in guides on an arm E (see Figs. 1$^a$ and 2) in such a way that it can be moved to and fro endwise along this arm, and the suckers thereby moved backward or forward. The arm E at its rear end can turn freely on a shaft F, and at its forward end it rests normally on a fixed support G. The rear end of the rod D is jointed to one arm of a crank-lever H, the other arm of which carries a weight H², which tends always to draw the rod backward. On the axis of this crank-lever is also an arm H', which by a link is coupled to a lever I. When the suckers are to be thrust forward against the plates, this lever is acted upon by a crank-pin J', which projects out from a disk J² on a shaft J, which is revolved continuously.

K K are pushers by which the plates are pressed forward along the guides B' into the tinning-pot B. The pushers descend from a bar L, which is carried by arms L' from the shaft F. Fixed on this shaft is also a slotted arm L², through the slot in which the crank-pin J' projects. In this way the pushers are raised and lowered as the shaft J is revolved. Just before the suckers are thrust forward against the plates the bar which carries them is raised somewhat to bring them into proper position. To do this the arm E at its forward end carries a horizontal bar E'. This at each of its ends is made to embrace loosely-curved bars L³, which project downward from the bar L, which carries the pushers. When the pushers K have arrived toward the end of their upward movement, stops L⁴ at the bottom of the bars L³ come against the under side of the ends of the bar E', and so carry upward with it the forward end of the rod D and the sucker-bar which is jointed to it.

C⁵ is an arm extending backward from the bar C².

M is a catch capable of sliding to and fro upon the rod D. Normally it catches over the rear end of the arm C⁵ when the stems of the suckers are parallel with the rod D.

N is a stop carried by the bar E', against which the catch M strikes when the rod D is thrust forward. This arrests the catch, and as the rod continues to be moved forward the rear end of the arm C⁵ gets clear of the catch, and the suckers are thus free to tilt.

C⁶ is a small projection from the front of the bar C², which comes below a stop C⁷ before the arm C⁵ is liberated from the catch M. This arrests further upward movement of the bar C², and this bar and the suckers which it carries are therefore compelled to tilt as the bar E' continues to rise. To limit the extent to which the suckers can be tilted, the rear end of the arm C⁵ passes through a metal loop C⁸. Extensions from this loop form guides, between which the catch M works to and fro.

To release the suckers from the plates, claws O are used, carried by jointed arms O' from an axis O². The bearings for this axis are carried by the bar C², and normally the suckers are held out of action by a weight O³, carried by an arm O⁴, fast on the axis O². O⁵ (see Figs. 7 and 8) is a spring, which tends to hold the two parts of the arm O' in a line with one another. When the bar C² descends down onto the fixed support G, the weighted arm comes against a stop P. The axis O² is thereby caused to turn and bring the claws O against the edge of the india-rubber disk of the sucker, and then as the axis O² continues to turn the arm bends into the position shown in Diagram 6 and the claw is drawn backward, carrying along with it the portion of the india-rubber disk with which it engages, so disengaging the disk from the plate. The plate will then be free from the sucker and can drop down into the tinning-pot.

The action of the apparatus is as follows: A pile of plates is placed in an inclined position, resting upon the inclined table or support A. As the axis J revolves and the arms which carry the pushers have completed most of their upward movement the suckers are somewhat raised in the manner above explained to bring them opposite to the portion of the plate against which they are to be pressed. The rod D is then thrust forward by the action of the crank-pin J' upon the lever I. The joints C³, which connect the sucker-bar C² to the rod D, are in this way brought in front of the bar E', by which the forward end of the rod is being lifted. The suckers would then be free to turn downward were it not that the arm C⁵ is caught by the sliding catch M. Just when the rod D has been thrust forward to such an extent that the arm C⁵ is nearly free from the catch M a projection from the front end of the arm comes close under the stop C⁷. The parts are shown in this position in Diagram 3. Immediately that the arm is free from the catch the sucker, which has now been pressed firmly against the plates, is tilted by reason of the joints C³ being carried upward a short distance farther by the continued upward movement of the bar E', and consequently of the rod D. By this movement the lower edge of the plate that the suckers are holding onto is bent somewhat away from the other plates in the pile, and this being done the remainder of the plate can very readily separate itself from the others when the suckers are moved back. The suckers are now at once drawn back by the action of the weight H² and the pushers commence to descend and carry along with them the arms, which carry the suckers. As the arms descend the weighted arm O⁴ comes against the stop P and is by it turned into the position shown in Diagram 6. As it does so the claws O lay hold of the edges of the flexible disks of the suckers and then are drawn backward, as above explained, to admit air between the disk and the plates which they are holding, and the plates are so released and allowed to drop between the guides B', which guide them down into the tinning-pot B. The pushers then descend onto the upper edges of the plates and push the plates forward along the guides until they are seized between the pairs of rolls to which the guides lead them.

What I claim is—

1. In apparatus used in coating metal plates, the combination of a pot for melted coating metal, a support for a pile of plates to be coated, a sucker or suckers, mechanism for pressing them against and causing them to lay hold of the outermost plate near one of its edges and for then tilting the suckers to bend this edge of the plate outward and for afterward drawing back the suckers away from the pile, and mechanism for then releasing the suckers from the plate to allow the plate to drop down into the bath of coating metal, substantially as described.

2. The mechanism for taking plates one by one from a pile of plates, consisting of a pneumatic sucker and mechanism by which such sucker is first brought against the front plate of the pile near one of its edges, then tilted to bend that edge outward away from the pile, and afterward moved back from the pile, and a claw which takes hold of a portion of the edge of the sucker and bends it back so as to release the sucker from the plate, substantially as described.

3. The combination of the pot for metal, the support for a pile of plates, the sucker, the rod to which it is jointed, the arm that supports the rod, the axis by which the rear end of the arm is supported, the fixed stop which normally upholds the front end of the arm, the pushers carried by arms which are fast upon the axis, mechanism for giving a rocking motion to the axis and for thrusting the rod toward or away from the axis, and mechanism for drawing back a portion of the outer circumference of the sucker after the sucker has been drawn backward away from the pile of plates, substantially as described.

DANIEL EDWARDS.

Witnesses:
   W. STOBO ANDREW,
   A. HELY,
*Clerks to Messrs. Beor & Plant, Solicitors, Swansea.*